(12) United States Patent
Paillet et al.

(10) Patent No.: US 8,601,770 B2
(45) Date of Patent: Dec. 10, 2013

(54) WEB WRAP APPARATUS FOR AGRICULTURAL BALERS

(75) Inventors: Fredéric Paillet, Gray (FR); Pascal Gresset, Arc-les-Gray (FR); Jean Viaud, Reyssouze (FR); Emmanuel Chapon, Velet (FR)

(73) Assignee: Deere & Company, Moline, IL (US)

( * ) Notice: Subject to any disclaimer, the term of this patent is extended or adjusted under 35 U.S.C. 154(b) by 340 days.

(21) Appl. No.: 12/718,055

(22) Filed: Mar. 5, 2010

(65) Prior Publication Data

US 2010/0236190 A1 Sep. 23, 2010

(30) Foreign Application Priority Data

Mar. 18, 2009 (EP) ...................................... 09155481

(51) Int. Cl.
*B65B 41/12* (2006.01)
*B65H 21/00* (2006.01)

(52) U.S. Cl.
USPC ................................ 53/389.3; 53/587; 53/211

(58) Field of Classification Search
USPC ......... 53/389.3, 587, 588, 211; 100/17, 19 R, 100/87–89
See application file for complete search history.

(56) References Cited

U.S. PATENT DOCUMENTS

| 5,152,123 | A | * | 10/1992 | Viaud et al. | 53/508 |
|---|---|---|---|---|---|
| 7,237,372 | B2 | * | 7/2007 | Chapon et al. | 53/587 |
| 7,513,088 | B2 | * | 4/2009 | Vande Ryse | 53/118 |
| 7,644,563 | B2 | * | 1/2010 | De Gersem | 53/587 |
| 7,784,400 | B2 | * | 8/2010 | Simmons | 100/87 |
| 2006/0242931 | A1 | * | 11/2006 | Ryse | 53/587 |
| 2007/0107377 | A1 | * | 5/2007 | Guthmann | 53/118 |
| 2007/0157556 | A1 | * | 7/2007 | Feraboli et al. | 53/399 |
| 2007/0277483 | A1 | * | 12/2007 | Vande Ryse et al. | 53/587 |
| 2008/0092756 | A1 | * | 4/2008 | Vande Ryse | 100/5 |

FOREIGN PATENT DOCUMENTS

| EP | 765 912 | | 4/1997 |
|---|---|---|---|
| EP | 0766912 | * | 4/1997 |
| WO | WO 2005/096801 A1 | * | 10/2005 |

* cited by examiner

*Primary Examiner* — Hemant M Desai
(74) *Attorney, Agent, or Firm* — Quarles & Brady LLP

(57) ABSTRACT

A web wrap apparatus is provided in conjunction with a round baler. The web wrap apparatus has a feeder, a separator for the web, and a motion means. An actuator is provided at the motion means, which assists the separator in cutting the web, when the separator gets close to a cutting position.

9 Claims, 7 Drawing Sheets

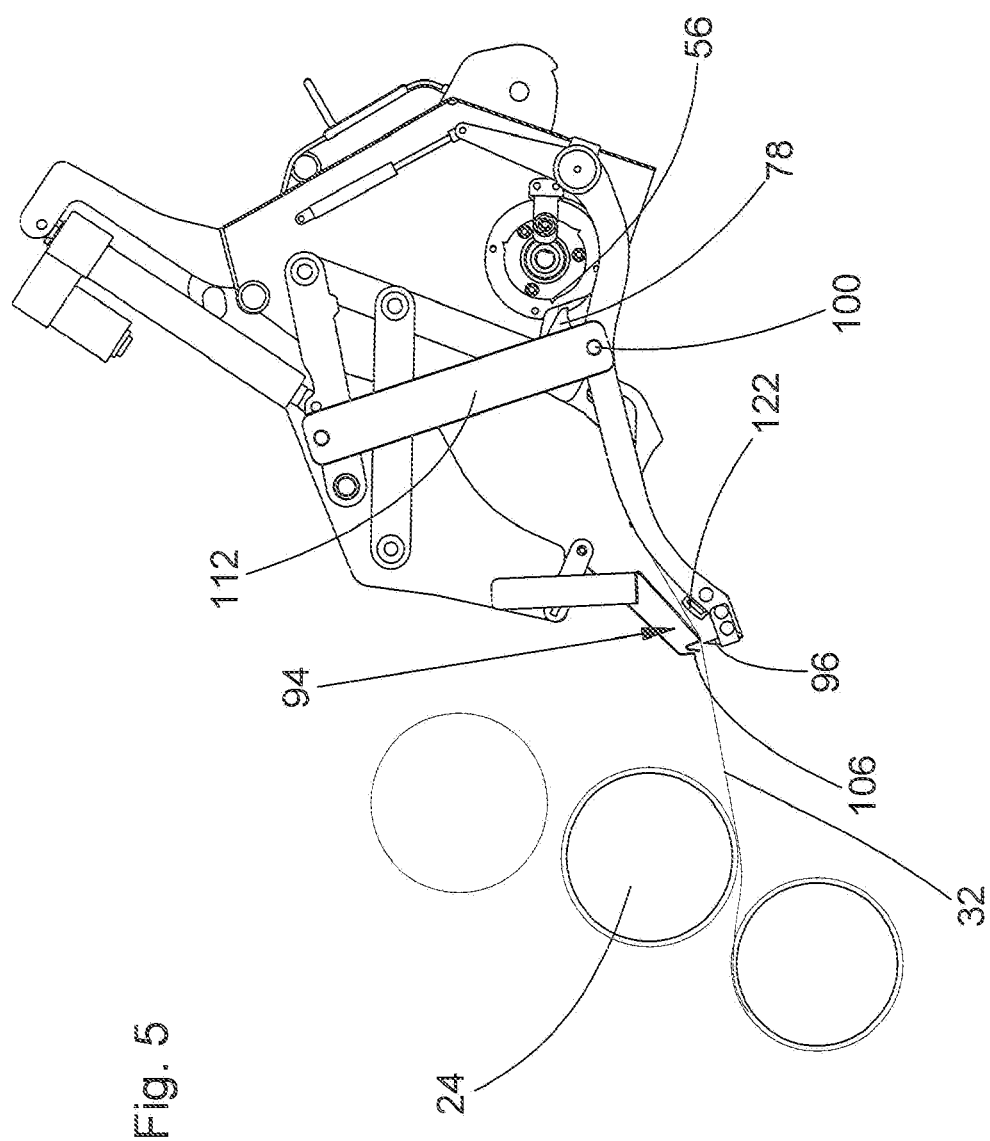

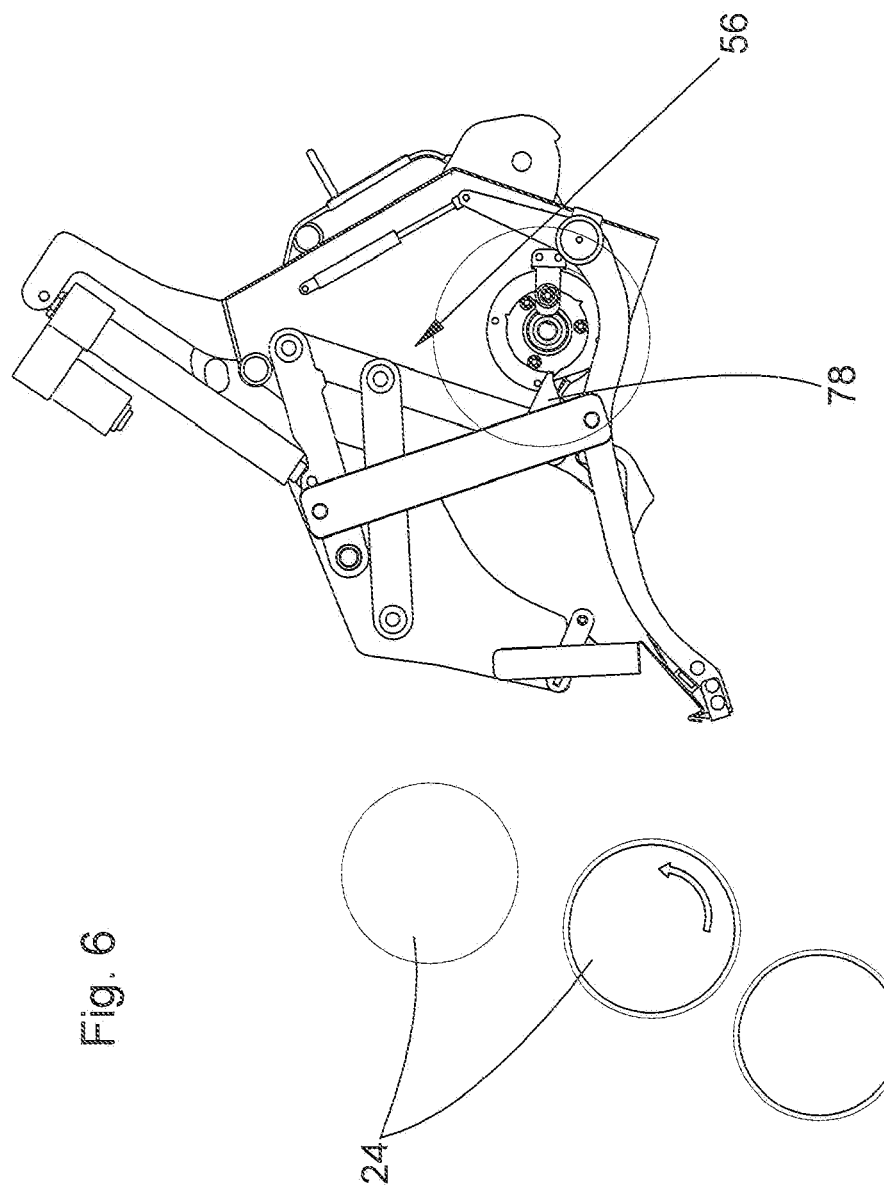

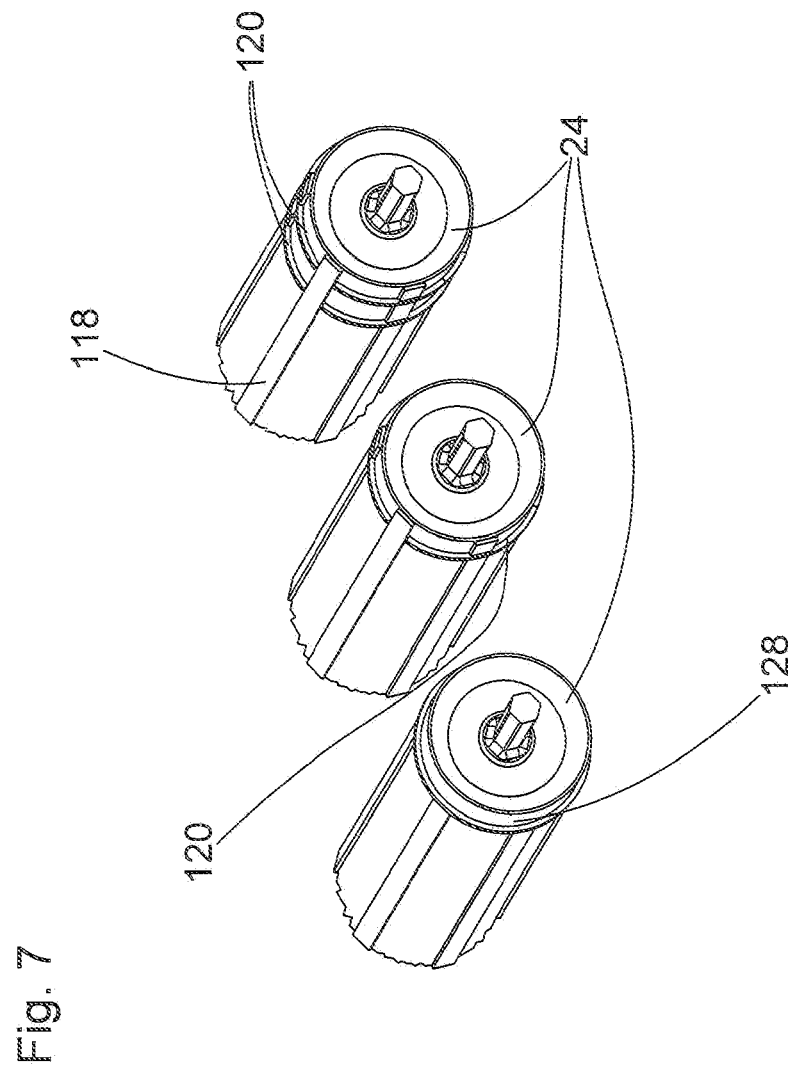

WEB WRAP APPARATUS FOR AGRICULTURAL BALERS

The present application claims foreign priority to EP Application 09155481.6 filed on Mar. 18, 2009.

FIELD OF THE INVENTION

This invention relates to a web wrap apparatus comprising a web driven motion means and a separator and to a round baler.

BACKGROUND OF THE INVENTION

EP 766 912 discloses a round baler having a net feed device, moveable between a waiting position and a feeding position. In the feeding position the feed device enters a space between a roll and a chain-slat-conveyor. A brake acts on a roll of net and is connected via links to the feed device as well as to a separating device. A series of rolls is provided between a web roll and the feed device, over which the web is routed.

SUMMARY OF THE INVENTION

The problem overcome by this invention is based on the difficulty of providing for the proper tension in the web at the right point in time and for the proper cutting force.

While in the prior art device, the tension in the web is created by braking a web roll, in the inventive design the braking force is transferred to the net by a motion means with a grippy surface, like rubber or a rough surface, which motion means is moved slower than the withdrawal speed of the web and/or is stopped from further movement. This is advantageous, as the diameter of the web roll will decrease and either an adjustment of the brake or of the brake force is needed, while the motion means remains unchanged. The web could be a net or plastic film and the drive of the motion means may happen by interaction with the web or by an active drive from a mechanical, hydraulic or electric source. The motion means could be a roll, a transport band, a wheel, or the like. The separator may be provided with a sharp edge, which itself is able to separate, i.e. cut or tear the web, or it could interact with a counter knife to create a shearing effect. The relationship between the motion means and the separator can be twofold—time wise, i.e. the motion means is stopped or decelerated when or shortly before the cutting operation happens and/or energy wise, i.e. the movement of the motion means is transferred to the separator to increase the cutting force or speed.

The interaction and movement relationship between the motion means and the separator may be controlled in various ways, such as mechanically, electrically or hydraulically. In the case of a mechanical interaction the motion means may have an actuator, like a stop, a cam, a tooth, etc. to launch or drive the movement of the separator. Interaction, especially a mechanical interaction with links or the like may happen directly or indirectly by using levers, cables, etc. In order to control the related movement, sensors, valves etc. may be used as actuators as well.

A reliable control of the operating sequence as well as of the timing of web feeding can be achieved by considering the position or movement of a feeder supplying the web to the article to be wrapped. This will assure, that e.g. a sufficient length of web is available to start a web wrapping cycle. The feeder may be of any type, like a duck-bill, feed rolls, moving fingers, etc.

In order to avoid an abrupt high tension in the web, which may create overload, or tearing of the web from a web retainer or destroy the surface of the motion means, a yieldable connection between the engaging means and the motion means is provided. This connection may be flexible or elastic, such as provided by springs, rubber blocks, etc. or it may be frictional, such as provided by friction liners as it is known from brakes and clutches; such friction force is preferably adjustable to compensate for wear or for different kinds of web, etc.

Web under tension will not pull back and/or wind around other parts, if its free end is kept at a given place, which may happen by using a retainer, such as a plate or other surface against or in which the web is pressed by the separator. The retainer may act via friction or by a positive look, such as with a toothed or knurled surface. Retaining the web may happen by direct pressing the web against a surface, but also indirectly by activating a clamp or the like by means of a sensor, switch, etc.

By using an elastic web retainer and/or an elastic applicator on the separator, it is possible to provide for sufficient retaining force, even if the related surfaces are not clean, not smooth, not straight, etc. Elasticity can be achieved by springs, rubber, foam or any other yieldable material.

A reduction in the number of parts, as well as a proper function of the retaining and separating process can be achieved, if the web retainer is suitable to cooperate with a separating edge of the separator. The simplest way to make this happen is the combination of the web retainer and the separating edge in a single piece.

A safe feeding of the web is achieved by using a feeder which pulls the leading edge of the web, rather than by rolls pulling the trailing area. The feeder may move linearly or on a circular path. The web may be gripped between two plates, rakes, fingers, etc. pressed against each other or by a knurled or toothed plate penetrating the web.

The movement of the motion means, which may be caused by a web pulled from its roll, can be monitored precisely, if the motion means is provided with one or more indicators, like pins, notches, magnets etc. causing a signal in an adjacent contact or contactless sensor. If such indicators are offset from the actuator, it cannot happen, that the indicators are in front of the sensor, when the motion means is in its resting position as fixed by the contact of the actuator and the driver.

While web apparatuses are used in many instances, like for wrapping boxes to be shipped, clothing, garbage, etc. their use in a round baler, especially for agricultural products, is very efficient. Such round balers can be of the fixed chamber or variable chamber type or a mix thereof and may contain rolls, belts, chains as baling elements.

In the case where a feeder is employed to feed web into a gap along at least one moving part, there is a risk, that the feeder will hit one of the moving parts, which is critical, if it has an uneven surface, as it is the case, if bars for better baling are provided. In order to avoid an interference of the feeder with such a rotating or other moving means, it is helpful to use anti-interference distance means being at least as high as any protrusion on the moving part, such, that the feeder cannot hit the protrusion and get destroyed or pushed back. Such anti interference distance means may be a ring, a bar or the like being in the way between the feeder and the protrusion.

BRIEF DESCRIPTION OF THE DRAWINGS

An embodiment of the invention is described in more detail below with reference to the accompanying drawings wherein:

FIG. 5 is a schematic side view of the web wrap apparatus in a partly retracted position;

FIG. 6 is a schematic side view of the web wrap apparatus in a fully retracted position; and, FIG. 7 is a perspective partial view of the baling elements of the round baler with anti-interference distance means.

DESCRIPTION OF THE PREFERRED EMBODIMENT

Figure 1:
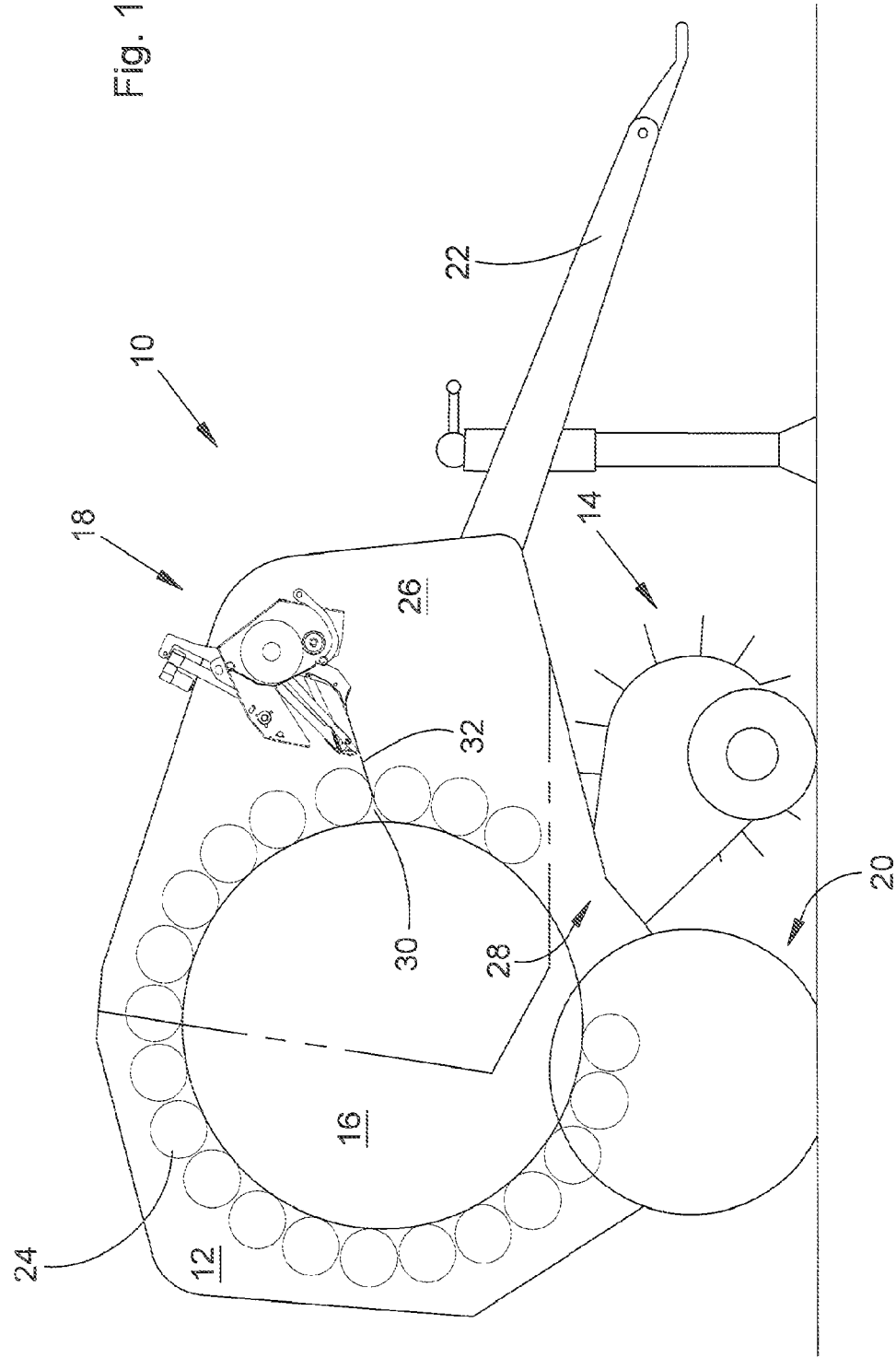
FIG. 1 is a schematic side view of a round baler provided with a web wrap apparatus.

FIG. 1 illustrates a round baler 10, which has a chassis 12, a pick-up 14, a bale chamber 16, a web wrap apparatus 18, an axle with wheels 20, a tongue 22 and a pressing means 24.

The round baler 10 is of ordinary fixed chamber design, but also could be a variable chamber baler.

The chassis 12 rests on the axle with the wheels 20, carries the pick-up 14 and is typically connected to a tractor or the like by means of the tongue 22. The chassis 12 has single or multi-part side walls 26, which are spaced from each other to enclose between them the bale chamber 16, all or part of the web wrap apparatus 18, and the pressing means 24.

The pick-up 14 picks up crop from the ground and delivers it to the bale chamber 16 through a crop inlet 28 between the pressing means 24.

The bale chamber 16 is covered substantially by the pressing means 24 on the circumference and by the side walls 26 on the face side. Besides the crop inlet 28 a gap 30 is provided between the pressing means 24, through which the web 32 may be fed into the bale chamber 16. The bale chamber 16 serves to form a cylindrical bale of hay, straw or the like, which will be covered by the web 32 of plastic film, net, paper or the like. The pressing means 24 in this embodiment are in the form of steel rolls rotatably received in the sidewalls 26 and extending perpendicular thereto. These pressing means 24 are arranged generally on a circle.

Figure 2:
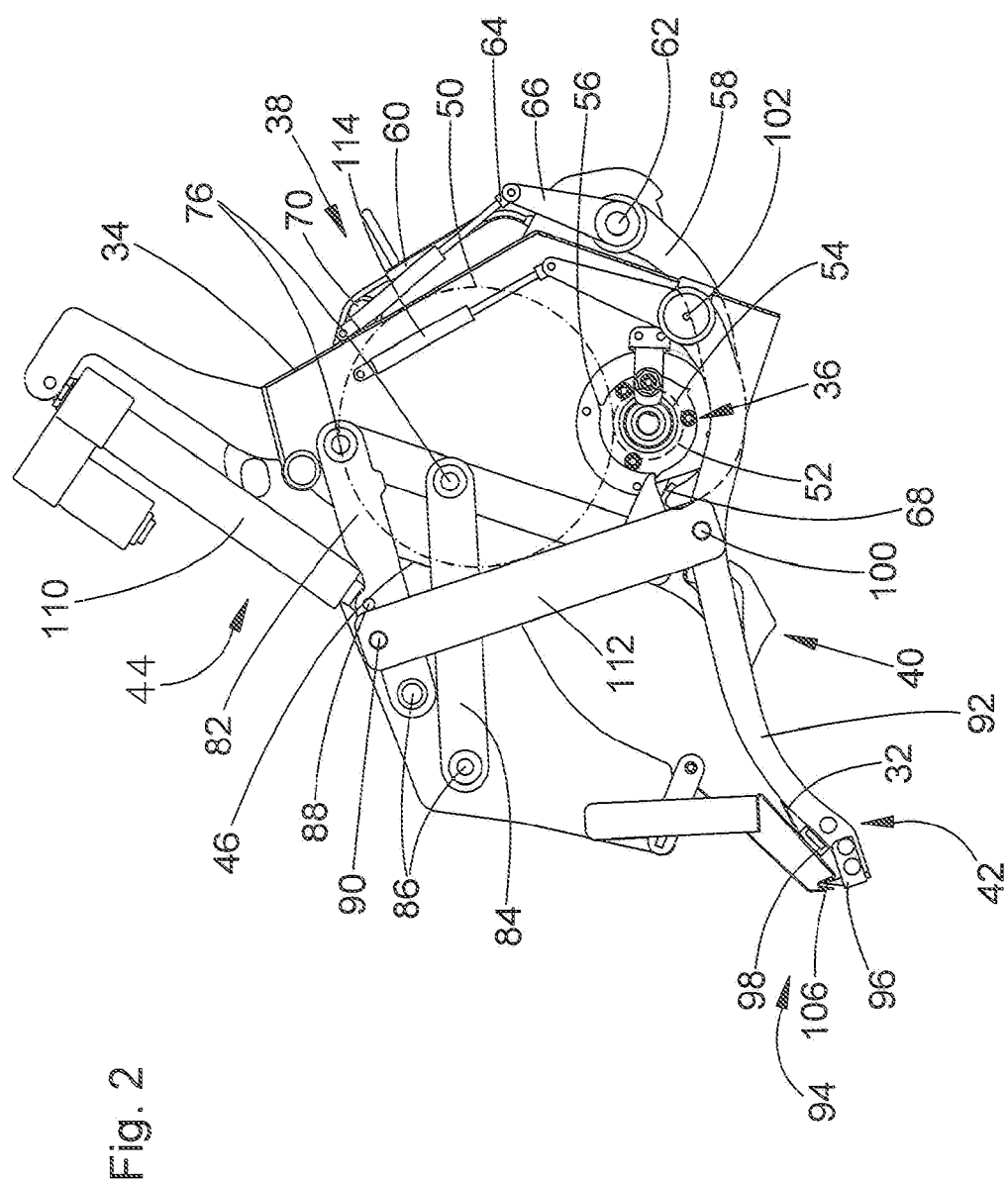
FIG. 2 is a schematic side view of the web wrap apparatus in a waiting position.

The web wrap apparatus 18 is visible in more detail in FIG. 2 and contains, among other things, a housing 34, a motion means 36, a brake device 38, a feeder 40, a separator 42, and an actuating mechanism 44.

The housing 34 is located in the front upper part of the round baler 10 between or substantially between the side walls 26 and has a rear wall 46 and left and right walls 48 connected to each other and suitable to be connected to the side walls 26. Depending on the width of the web 32, the housing 34 and the entire web wrap apparatus 18 may extend beyond the side walls 26. The rear wall 46 may be of a material or have a layer which creates a certain friction, which influences the rolling resistance of a roll 50 of the web 32. The housing 34 may be used to attach all components and parts of the web wrap apparatus 18 to it to form an autonomous unit. The right and left walls 48 extend to the rear toward the bale chamber 16 as is needed to house some of the parts described later.

The motion means 36 is formed by a roll 52, preferably rubber coated, which is journalled rotatably about a horizontal axis in the walls 48 and which is located such, that the roll 50 of the web 32 can rest on it. At least with one end, the roll 52 extends beyond the walls 48 and possibly even beyond the side walls 26 and is provided with a yieldable clutch 54, which may be a slip clutch, a rubber block between a flange and the roll 52, or similar means. The clutch 54 has several—as illustrated, three—actuators 56 evenly distributed on the circumference of a disc rotating with it; it should be noted that one would be sufficient. The actuators 56 may be stops, noses, or the like, protruding radially, but may also be grooves or notches in the circumference. When viewing the drawing, the roll 52 has approximately the same diameter as the clutch 54. As is known in the art, but not shown here, the roll 52 is connected via a chain drive and a free-wheel to the pressing means 24 such, that it must rotate slower than the pressing means 24.

The brake device 38 substantially has a control arm 58 and a brake arm 60 connected together in a shaft 62 to pivot about a horizontal axis of the latter. Also a gas spring 64 is connected to the shaft 62 via an arm 66 to assist or resist its rotational movement. It is the purpose of the brake device 38 to exert a certain pressure onto the roll 50 of the web 32 to assure a sufficient tension in it, when it is wrapped onto a bale (not shown). The shaft 62 is located at about the same height as the roll 52 and at a certain distance to it forwardly. The control arm 58 extends underneath the roll 52 to a side opposite to the shaft 62 and ends at about the center of the roll 52. The control arm 58 has an idler bar 68 or an angle extending parallel to the axis of roll 52 between the walls 48. The brake arm 60 extends from the shaft 62 to a location above a completely wrapped roll 50 of the web 32 and has a cross means 70 designed to push onto the circumferential surface of the roll 50, thereby pressing the roll 50 against the rear wall 46 and creating the desired rolling resistance. As should be apparent from the drawing, a downward, counter clockwise movement of the control arm 58 will provoke a counter clockwise movement of the brake arm 60 upon the roll 50 of the web 32.

Figure 3:
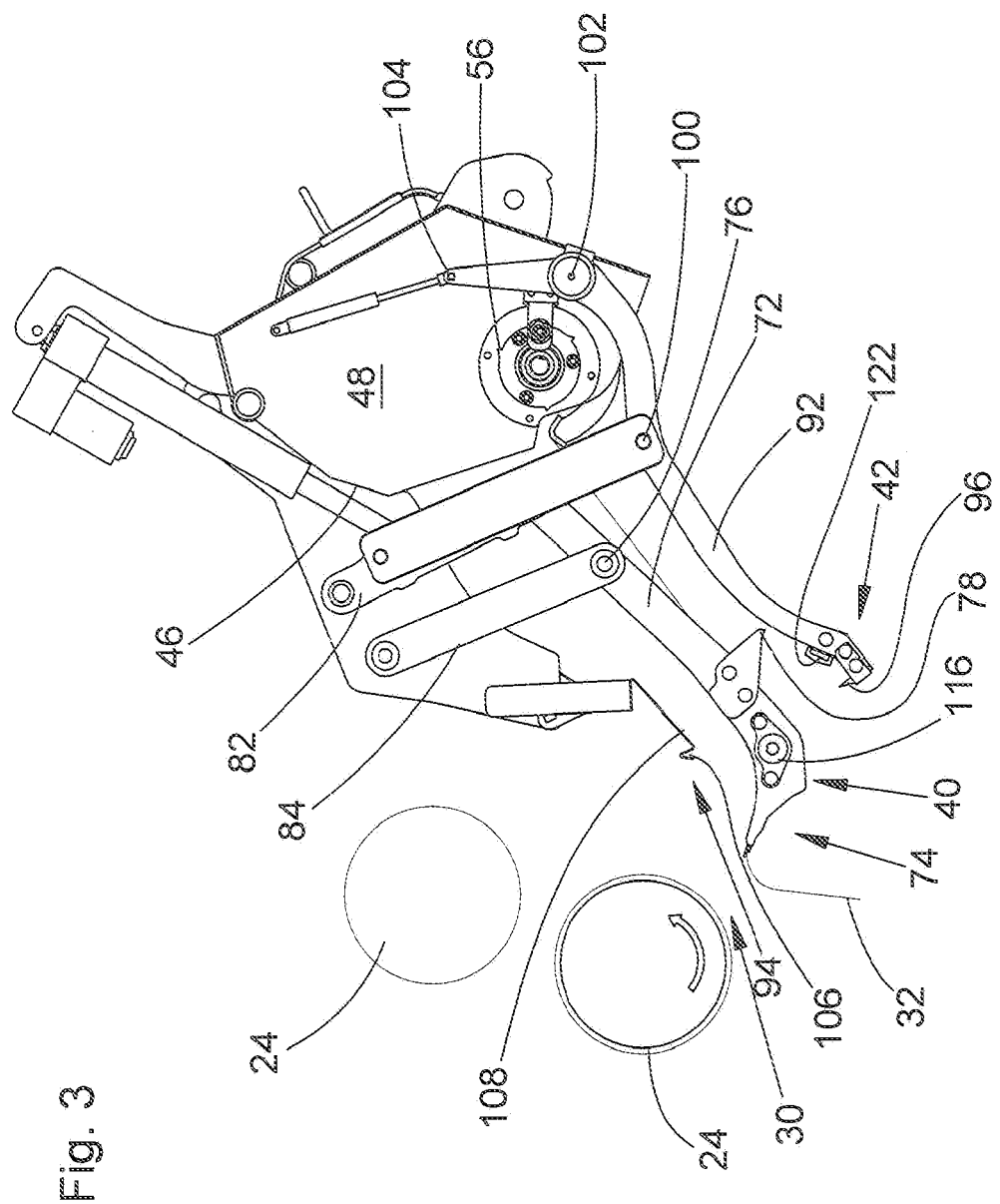
FIG. 3 is a schematic side view of the web wrap apparatus in an intermediate position.

The feeder 40 in this embodiment (see also FIG. 3) is formed as a so-called "duckbill", however it could be any other moving part pulling the web 32 from the roll 50 and feeding it into the bale chamber 16 through the gap 30. The feeder 40 is composed of a strut 72 on each side holding between them a carrier 74 in the form of a mouthpiece at a lower end thereof, two vertically distant bearings 76 in an upper region, and a driver 78 positioned between the carrier 74 and the lower bearing 76 at the side of the strut 72 opposite of the carrier 74. The carrier 74, as such is known, and has two opposite plates biased onto each other to clamp a piece of the web 32 and move it forward. An upper link 82 and a lower link 84 forming part of a parallelogram linkage, are connected with one end area to the bearings 76 and with their other end areas to bearings 86 on the walls 48 being offset horizontally as well as vertically; lines through the bearings 76 at one end and the bearings 86 at the other end do not run parallel but divergently. The upper link 82 has an eye 88 on its upper side or a bore or the like, useful to provide a connection to another part, as well as a journal 90, which in this case, but not necessarily, is located between the eye 88 and the bearing 86. An idler means 116 is connected to and connects the struts 72 on both sides and is provided between the carrier 74 and the driver 78. As can be seen in FIG. 3 this idler means 116 assists in feeding the web 32 in a proper way into the carrier 74. The idler means 116 may consist of a simple bar or shaft.

The separator 42 has two substantially S-shaped, but almost horizontally oriented arms 92 and a counter means 94, which both serve to cut or separate a portion of the web 32 wound around a bale from a portion remaining on the roll 50. In their rear end areas, shown at the left in the drawing and facing the bale chamber 16, the arms 92 carry an upwardly oriented separating edge 96 or knife and a rubber block 122, which is oriented the same way, but provided with respect to the separating edge 96 opposite of the bale chamber 16 and which forms one part of a retainer 98. A bearing 100 is located substantially in the transition area between the two curves of the "S" and is followed by a bearing 102 at about ⅔ of the remaining length of the second curve and a bearing 104 at the end of the arms 92. A counter means 94 is formed of a bent sheet metal, which in this case is flexible to some extent and has a notch 106, into which the separating edge 96 may enter and a plate 108 or surface, which is positioned such, that it can be contacted by the rubber block 122, when the separator 42 is moved against it. The counter means 94 is attached to the walls 48 and located close to the gap 30. A plate 108 forms another part of the retainer 98. The actuating mechanism 44 includes a motor 110, a link 112 and a spring 114. The motor 110, which may be actuated electrically, hydraulically or pneumatically is connected with one side to walls 48 or any other stationary means of the chassis 12 and with the other side to the eye 88 on the upper link 82. The link 112 is a straight rigid bar extending between and connecting bearings 90 on the upper link 82 and the bearing 100 on arms 92. The spring 114 is formed as a gas spring, but could be of any other kind, and is connected at one end to walls 48 and at the opposite end to the bearing 104 at the end of the arms 92.

Connected to the clutch 54 and thus to the roll 52 are three indicators 124 rotating with the roll 52, once the web 32 is pulled from the roll 50. A sensor 126 is located close to the travel path of these indicators 124 to sense their movement. These indicators 124 are offset angularly with respect to the actuators 56.

FIG. 7 shows three versions of a pressing means 24, which is formed as a roll. Such pressing means 24 are provided on at least one side of the gap 30. The pressing means 24 are provided with axially extending protrusions 118; these may show also an inclination to the axis of the pressing means 24 and may be bars welded or bolted to a roll body or ribs pressed into the surface of the pressing means 24. Also provided are anti-interference distance means 120 on the circumference of the pressing means 24. The anti-interference distance means 120 are formed as rings of at least the same height as the protrusions 118 or even slightly higher. As is shown in FIG. 7 one or more anti-interference distance means 120 may be provided and they may be provided at the end of the protrusions 118 or intersecting them. The leftmost pressing means 24 shows a contact area 128 in a lateral end area and following the protrusions 118 axially, which contact area 128 is smooth and could be contacted by a non-shown anti interference distance means 120 provided on the leading edge of the feeder 40. The anti-interference distance means 120 would be opposite of the contact areas 128 and would block an access of the remaining part of the leading edge to the protrusion 118. Depending on the rotation of the bale in the bale chamber 16 at least one of the pressing means 24 forming the gap 30, rotates away from the bale chamber 16 in the plane of the gap 30 (see the arrow in FIG. 3). It will be noted that the gap 30 is very narrow and leaves little space for the carrier 74. The dimensions of the gap 30, the carrier 74, the protrusions 118 and the anti-interference distance means 120 are chosen such, that in the case of a mechanical deformation of the feeder 40 or of a moveable part of it not returning to a feed position properly, the carrier 40 would contact the anti-interference distance means 120 but could not reach the protrusions 118. Thus it would neither be pushed out of the gap 30 nor destroyed. The use of such anti-interference distance means 120 in relation to the protrusions 118 can be considered as an invention in itself.

Based on this structural description the function is described as follows starting from a state shown in FIG. 2, in which the web wrap apparatus 18 waits to be operated. In a state as shown in FIG. 2, the roll 50 with the web 32 is placed on the roll 52 and is secured in its position between the cross means 70 and the rear wall 46. The arms 92 rest against the counter means 94 and the feeder 40 is in a position remote from the gap 30. The web 32 extends from the roll 50, underneath the roll 52 over the idler bar 68, through the carrier 74 to a location between the separating edge 96 and the notch 106, whereas it is clamped between the plate 108 and the rubber block 122 at a place slightly upstream of it. The driver 78 rests against the actuator 56 to keep the roll 52 from rotating.

Figure 4:
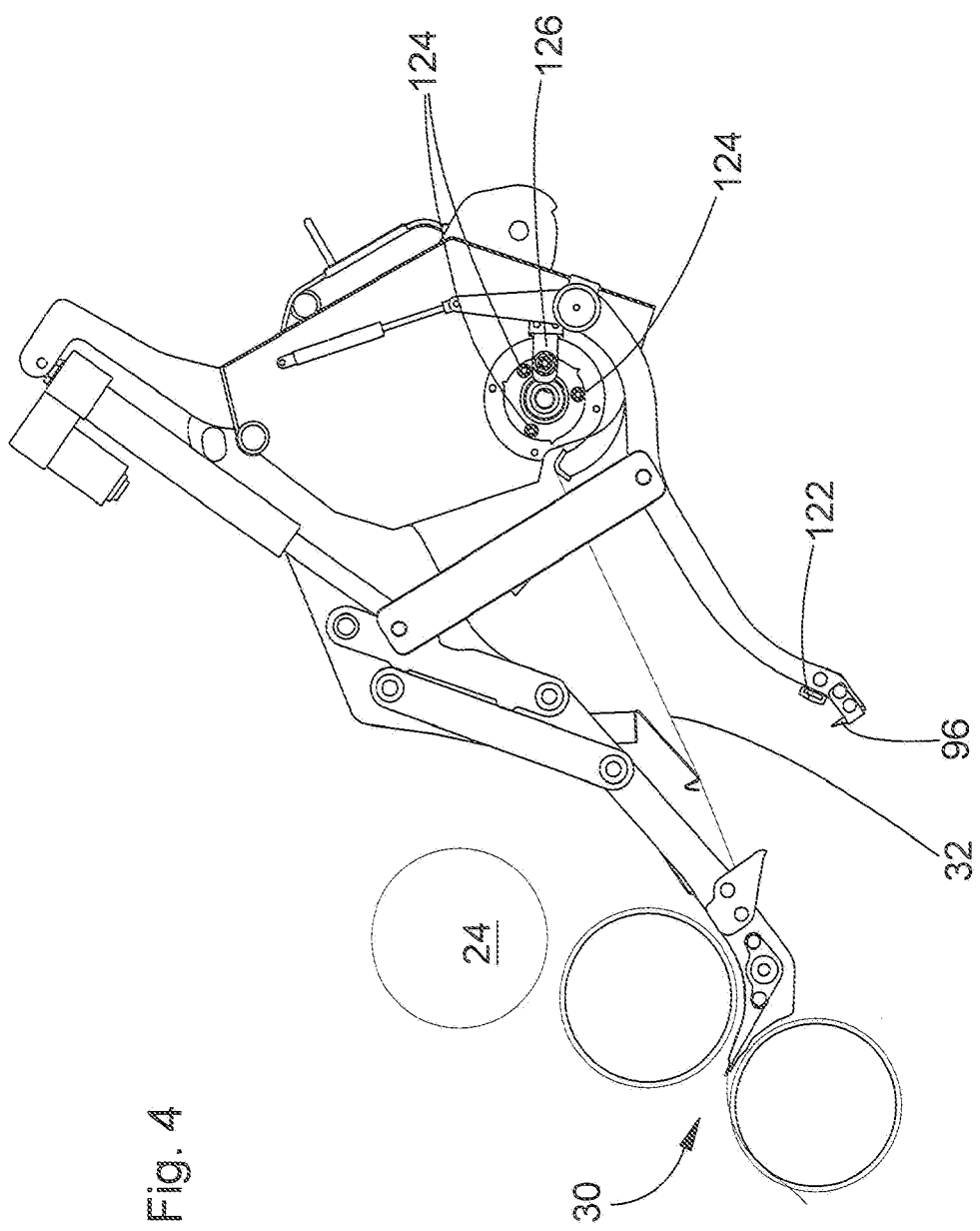
FIG. 4 is a schematic side view of the web wrap apparatus in a feeding position.

As soon as a manual or electrical signal is given to the actuating mechanism 44 to initiate wrapping web 32 around a bale, the motor 110 is extended, thereby moving the arms 92 away from the counter means 94, moving the feeder 40 downward and towards the gap 30, which releases the driver 78 from the actuator 56. FIG. 3 shows, that the separator 42 moves away sufficiently to allow the feeder 40 to enter the gap 30. Once the carrier 74 protrudes into the gap 30, the web portion hanging down from the carrier 74 is caught by the rotating bale and pulled from the roll 50. Tension is created in the web 32, since the roll 50 experiences friction on the wall 46 and since the roll 52 is hindered from free movement. According to FIG. 4 the web 32 is inserted into the gap 30 and caught by the rotating bale. FIG. 5 shows a situation, in which the motor 110 gets retracted and thereby the feeder 40 is on its way back to a resting position and the driver 78 approaches the actuator 56. Dimensions, locations and arrangements of the feeder 40 and the separator 42 are chosen such, that in the situation of FIG. 5, shortly before the web 32 is separated, the web 32 is pulled over the rubber block 122 at one side and over the counter means 94 on its other side, but not or hardly over the tip of the separating edge 96. This helps to avoid unnecessary wear on the separating edge 96, premature tearing of the web 32, and thus achieves a clear cut or separation of the web 32. As a next step, the driver 78 engages the actuator 56, which rotates together with the roll 52. As a result the link 112 is abruptly kicked upward, which assists the upward movement of the arms 92 initiated by the motor 110, and the spring 114. In order to dampen the shock on the roll 52 either the clutch 54 allows a slipping movement, or if the clutch 54 contains rubber blocks or the like, the driver 78 will be accelerated by the first compressed and then expanding rubber. As a further consequence, and as shown in FIG. 6 the accelerated separating edge 96 presses the web 32 into the notch 106 and clamps it as well between the rubber block 122 and the plate 108, which increases tension in the web portion connected to the bale and finally leads to its separation. The piece of the web 32 extending from the separating edge 96 to the carrier 74 is the one hanging down, when wrapping starts again.

Having described the preferred embodiment, it will become apparent that various modifications can be made without departing from the scope of the invention as defined in the accompanying claims.

The invention claimed is:

1. A round baler provided with a web wrap apparatus comprising a web driven motion means and a separator, wherein a web of wrapping material is cut by an interaction between the motion means and the separator movement of the motion means being transferred to the separator to increase at least one of a cutting force and a speed, and the motion means having an actuator to at least one of launch and drive the movement of the separator, further comprising a gap to feed the web into a bale chamber, wherein on at least one side of the gap a rotating pressing means, is provided having at least one protrusion and an anti-interference distance means, being at least as high as the protrusion.

2. A round baler according to claim 1, wherein a relative movement between the motion means and the separator is controlled by one of: electrically, hydraulically or mechanically, and wherein in the case of a mechanical control, an actuator is provided with the motion means for acting on the separator.

3. A round baler according to claim 2, wherein a feeder for the web is connected to the actuator and the separator.

4. A round baler according to claim 3, wherein the feeder has one of a carrier for a mechanical interference with the web and two opposite clamping means for a friction connection with the web.

5. A round baler according to claim 2, wherein a yieldable connection is provided between the actuator and the motion means.

6. A round baler according to claim 2, wherein the motion means is provided with one or more indicators for causing a signal in a sensor indicative of a movement of the motion means, the indicator being angularly offset from the actuator.

7. A round baler according to claim 1, wherein a web retainer is activated by the separator.

8. A round baler according to claim 7, wherein the web retainer is formed at least partially elastically.

9. A round baler according to claim 7, wherein the web retainer cooperates with a separating edge of the separator.

* * * * *